United States Patent
Griffin et al.

(10) Patent No.: US 6,174,551 B1
(45) Date of Patent: Jan. 16, 2001

(54) PROCESS FOR PREPARING A NUTRITIONAL SUPPLEMENT

(75) Inventors: Martin W. Griffin, Taylor Mill; Steven D. Thomas, Falmouth; John L. Crowley, Alexandria, all of KY (US); Eugene M. Weddington, Loveland, OH (US)

(73) Assignee: Griffin Industries, Inc., Cold Springs, KY (US)

( * ) Notice: Under 35 U.S.C. 154(b), the term of this patent shall be extended for 0 days.

(21) Appl. No.: 09/380,083

(22) PCT Filed: Feb. 12, 1998

(86) PCT No.: PCT/US98/02854
§ 371 Date: Aug. 25, 1999
§ 102(e) Date: Aug. 25, 1999

(87) PCT Pub. No.: WO98/37773
PCT Pub. Date: Sep. 3, 1998

Related U.S. Application Data
(60) Provisional application No. 60/038,863, filed on Feb. 27, 1997.

(51) Int. Cl.[7] .............................. A23L 1/312; A23L 1/48
(52) U.S. Cl. .................................. 426/53; 426/54; 426/55; 426/59; 426/443; 426/657; 426/807
(58) Field of Search .................................. 426/53, 55, 443, 426/54, 59, 657, 807

(56) References Cited

U.S. PATENT DOCUMENTS

| | | |
|---|---|---|
| 2,975,055 | 3/1961 | Brown et al. . |
| 3,272,632 | 9/1966 | Speer . |
| 3,617,313 | 11/1971 | Harrington, Jr. et al. . |
| 4,089,978 | 5/1978 | Lugay et al. . |
| 4,269,865 | 5/1981 | Retrum . |
| 4,307,119 | 12/1981 | Robinson, Sr. . |
| 4,497,733 | 2/1985 | Retrum . |
| 4,908,220 | 3/1990 | Shih et al. . |
| 4,957,748 | 9/1990 | Winowiski . |
| 4,959,311 | 9/1990 | Shih et al. . |
| 5,049,397 | 9/1991 | Kolbeck et al. . |
| 5,063,161 | 11/1991 | Shih et al. . |
| 5,171,682 | 12/1992 | Shih et al. . |
| 5,186,961 | 2/1993 | Shih et al. . |
| 5,459,162 | 10/1995 | Saxton . |
| 5,505,968 | 4/1996 | Schaefer et al. . |

FOREIGN PATENT DOCUMENTS

| | | |
|---|---|---|
| 1496143 | * 12/1977 | (GB) . |
| 2245475 | * 1/1992 | (GB) . |

\* cited by examiner

*Primary Examiner*—Anthony J. Weier
(74) *Attorney, Agent, or Firm*—King & Schickli PLLC

(57) ABSTRACT

A process for preparing a nutritional supplement includes the steps of mixing animal blood solids, hydrolized poultry feathers and animal offal to create a mixture, adding protease enzyme to the mixture (20), digesting the mixture with protease enzyme (28) and drying the digested mixture (38) in order to reduce the moisture content thereof down to 5–8 weight percent. During processing, the digested mixture is never exposed to temperatures above approximately 83° C. so that the blood and offal are not degraded or denatured and remain intact so as to provide full nutritional benefit.

16 Claims, 1 Drawing Sheet

PROCESS FOR PREPARING A NUTRITIONAL SUPPLEMENT

This application claims the benefit of U.S. Provisional Patent Application Serial No. 60/038,863, filed Feb. 27, 1997 and entitled "Process for the Preparation of a Nutritional Supplement".

TECHNICAL FIELD

The present invention relates generally to a process for preparing a nutritional supplement and more specifically, a nutritional supplement designed to provide the desired amino acids and essential nutrients to promote the growth of young animals.

BACKGROUND OF THE INVENTION

Food additives are substances that may be added to foods during processing in order to improve desirable chemical or physical characteristics and food quality. One of the most important forms of food additives are nutritional supplements. These typically comprise proteins, minerals and vitamins that are added to foods in order to restore nutritional values lost during food processing or to supplement the natural content of the food nutrients. The importance of the use of nutritional supplements to enhance the health and growth of farm animals has long been recognized in the field of animal husbandry.

It has also long been recognized that the production of nutritional supplements from various by-products of food rendering operations is highly desirable. Specifically, by establishing a commercial use for these by-products, the economic viability of the food rendering process is enhanced and otherwise difficult waste material handling is reduced or altogether avoided. This is a particularly important concept for the poultry rendering industry where significant amounts of waste materials are produced. Accordingly, various methods have been developed for the utilization and processing of feathers and offal as a nutritional supplement for food products. Such prior art processes are generally disclosed in, for example, U.S. Pat. Nos. 3,272,632 to Speer and 4,269,865 to Retrum.

One of the primary drawbacks in the prior art processing of waste products such as feathers and offal into nutritional supplements has been the heat degradation of various amino acids and proteins that effectively eliminates these materials as a source of nutrition. Accordingly, a need is identified for an improved method of processing waste products such as feathers and offal so as to avoid heat degradation of important amino acids and proteins and thereby provide a supplement with enhanced nutritional values.

SUMMARY OF THE INVENTION

It is a primary object of the present invention to provide an economical and effective process for preparing a nutritional supplement designed to provide the desired amino acids in a highly available form to promote the growth of young animals and more particularly farm animals such as piglets.

Yet another object of the present invention is to provide a continuous process for preparing a nutritional supplement from whole blood, feathers and offal allowing far more efficient production while requiring relatively inexpensive equipment and, therefore, a minimal capital expenditure to initiate production.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, the present method includes the step of mixing animal blood, hydrolized poultry feathers and poultry offal at respective weight ratios of approximately 4–6/2–4/1–3 depending upon the particular application of the end product.

More specifically, fresh whole blood is steam coagulated and then pumped into a decanter centrifuge to separate the liquid and solids. The solids are used in the present process. The feathers are previously heat hydrolyzed utilizing a steam treatment or other means in accordance with various methods known in the art to produce a hydrolyzed feather product of approximately 50% moisture and 50% hydrolyzed feathers that is used in the present process. In this way, the feathers undergo a partial protein breakdown so as to be more digestible with enzymes during subsequent processing. The poultry offal is used fresh.

After mixing the coagulated animal blood solids, the heat hydrolyzed feather product and the fresh poultry offal, the mixture is ground or milled in order to produce a particle size of, for example, no greater than ¼ inch in diameter. This step serves to increase the surface area of the poultry feathers and poultry offal parts in order to enhance the digestive activity of enzymes and microorganisms active in the process.

Next is the adding of a protease enzyme to the ground mixture in order to digest the mixture. Various protease enzymes and mixtures thereof may be utilized. Preferably the enzyme(s) are added at a rate of approximately one gallon per 4000 lbs of product mixture. Next is the digesting of the ground or milled mixture by the enzyme at a temperature of substantially 54–72° C. for up to 35–60 minutes. This is followed by the spray drying of the digested mixture and the heating of the product to a maximum of 83° C. in order to reduce the moisture content down to 5–8 weight percent and kill any pathogens present in the mixture. This is then followed by the sizing of the final product.

Advantageously, by only subjecting the mixture of feathers, animal blood and offal to enzyme hydrolysis and avoiding high processing temperatures, a more digestible food product is produced. Further, the amino acids in the food product and more particularly the blood and offal are not degraded or denatured and, therefore, remain intact for the full nutritional benefit of the feeding animal.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Figure 1:
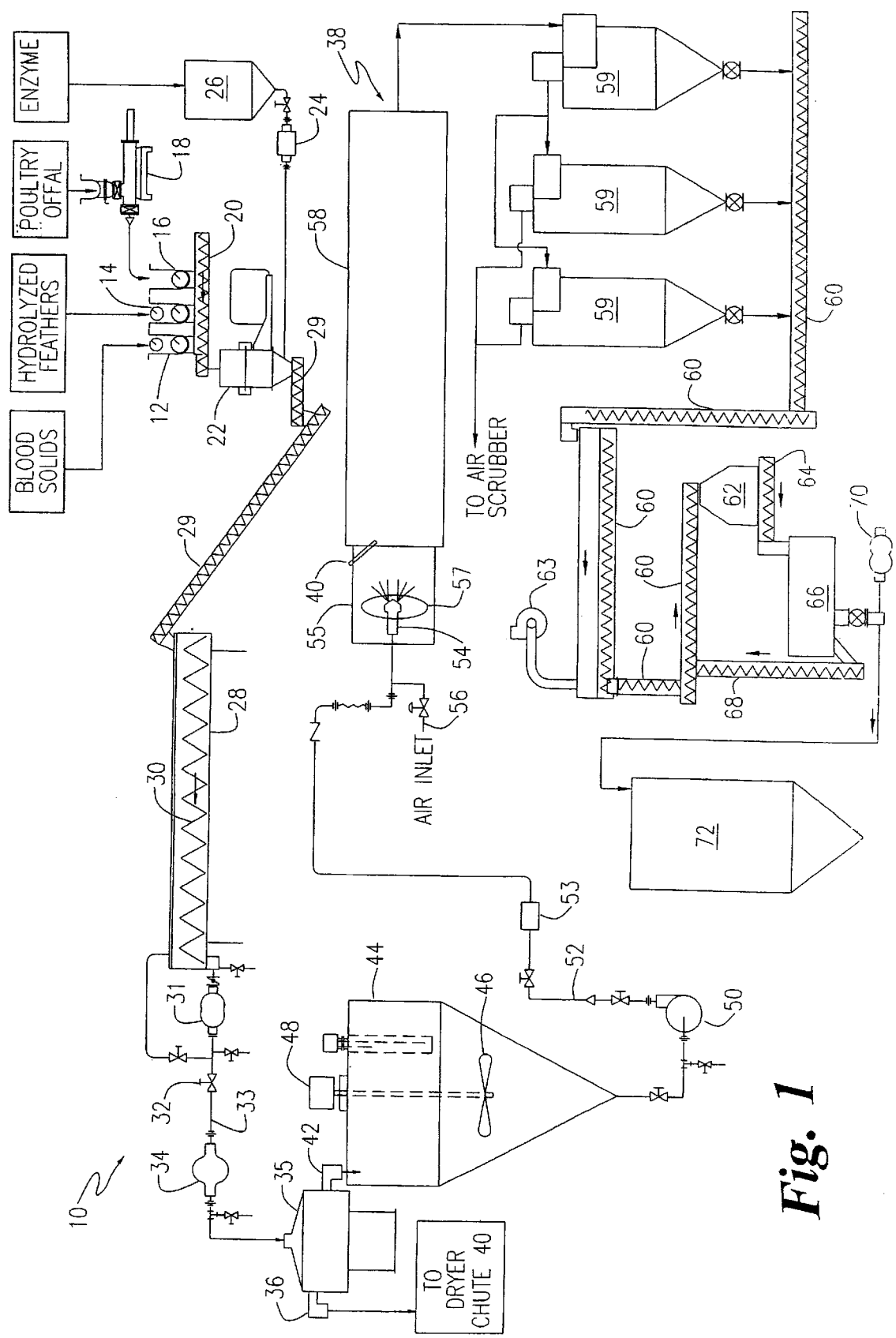
FIG. 1 schematically details the process of the present invention and the equipment utilized to complete that process.

Reference will now be made in detail to the present preferred embodiment of the invention, an example of which is illustrated in the accompanying drawing.

DETAILED DESCRIPTION OF THE INVENTION

The process of the present invention for preparing a nutritional supplement from animal blood, hydrolyzed poultry feathers and animal offal will now be described in detail with reference to the drawing figure showing an apparatus 10 that may be utilized for this purpose. As shown, steam coagulated blood solids are delivered to a first bin 12 while hydrolyzed feathers are delivered to a second bin 14 and fresh poultry offal is delivered to a third bin 16 by means of a pump 18. Measured quantities of these ingredients are delivered from the bins 12, 14 and 16 to the screw conveyor 20 which mixes and delivers the coagulated blood solids, hydrolyzed feathers and poultry offal to a grinder 22. There the blood solids, hydrolyzed poultry feathers and poultry offal are thoroughly mixed at respective weight ratios of approximately 4–6/2–4/1–3 depending upon the particular application of the end product. As indicated above, the feathers utilized in the process have been previously heat hydrolyzed by means of a steam treatment or other means in accordance with the various methods known in the art to produce a hydrolyzed feather product of approximately 50% moisture and 50% hydrolyzed feathers. Thus, the feathers undergo a partial protein breakdown so as to be more digestible with enzymes during subsequent processing.

Protease enzyme is supplied via pump 24 from storage vessel 26 to the grinder 22. There the blood solids, hydrolyzed feather and poultry offal mixture is ground or milled in order to produce a particle size of, for example, no greater than ¼ inch in diameter. This grinding step serves to increase the surface area of the poultry feathers and poultry offal parts in order to enhance the digestive activity of the enzymes and microorganisms active in the process. Preferably, the enzymes are added at a rate of approximately one gallon per 4000 pounds of product mixture.

The thoroughly ground and mixed blood solids, hydrolyzed feathers, poultry offal and protease enzymes are delivered from the grinder 22 to a digester tank 28 by a series of screw conveyors 29. The ground or milled mixture is then digested by the enzymes in the digester tank at a temperature of substantially 54–72° C. for up to 35–60 minutes. A screw conveyor 30 in the digester tank 38 insures processing of the mixture for the appropriate residence time.

Following digestion, the mixture is delivered by a positive displacement pump (pneumatic blower) 31 past valve 32 through line 33 to a masserater 34 where it is thoroughly masserated. Next, the mixture is screened using state-of-the-art screening equipment 35. Specifically, the relatively low moisture meal is separated from the mixture through the discharge outlet 36 for downstream delivery to the dryer 38 by means of the chute 40. The relatively high moisture content water phase including relatively small digested hydrolyzed feather and poultry offal particulates is delivered through the outlet 42 into the mixing tank 44. The mixing tank 44 includes an agitator 46 driven by a motor 48 which insures that the particulates remain in suspension. A pump 50 delivers the water phase and suspended digested particulates past various valves in line 52 through a flow meter 53 to a spray nozzle 54 in the burner section 55 of dryer 38. Simultaneously, compressed air is delivered through the inlet 56 (at a pressure of substantially 60–85 and more preferably 75–80 psig) and directed to the nozzle 54 so that the water phase is sprayed within the burner ring 57 for rapid drying in a manner described in greater detail in co-pending U.S. patent application Ser. No. 08/841,230 filed Apr. 29, 1997, entitled "Method and Apparatus for Drying and Processing Raw Food Material", the disclosure of which is fully incorporated herein by reference.

Following flash drying in the burner section 55, the sprayed material mixes with the meal delivered through the chute 40 in the rotary section 58 of the dryer 38. As a result of the combined drying action the moisture content of the mixture is reduced down to approximately 5–8 weight percent.

Now the dried feed mixture is air delivered to a series of cyclones 59 which function to recover the mixture which is then delivered by a series of screw conveyors 60 to a mill 62. During delivery, a cooler fan 63 provides a flow of cooling air in order to maintain the mixture at a lower temperature. In the mill 62 the feed mixture is milled to the desired final product size. The final product is then delivered by screw conveyor 64 to a screen 66 for sizing. The resulting product may be recycled from the screen 66 by means of the screw conveyors 68, 60 back to the mill 62 to rescreen. In most instances, the feed product is delivered by operation of the pneumatic blower 70 to a storage vessel 72 where it is held for packaging or further processing.

In summary, numerous benefits result from employing the concepts of the present invention. By only subjecting the mixture of hydrolyzed feathers, blood solids and offal to enzyme hydrolysis and avoiding high processing temperatures above approximately 83° C., a more digestible food product is produced. Further, the amino acids in the food product and more particularly the blood and offal are not degraded or denatured and therefore, remain intact for the full nutritional benefit of the feeding animal.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, offal other than poultry offal may be used in the process. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for preparing a nutritional supplement providing desired amino acids to promote the growth of young animals, comprising:

mixing animal blood, hydrolyzed poultry feathers and animal offal to create a mixture;

adding protease enzyme to said mixture;

digesting said mixture with said protease enzyme; and drying said digested mixture in order to reduce the moisture content thereof down to 5–8 weight percent and kill any pathogens present in said mixture.

2. The process set forth in claim 1, further including grinding/milling said mixture prior to adding said protease enzyme in order to increase the surface area of solid particles in said mixture for enhanced enzymatic activity.

3. The process set forth in claims 1, further including sizing a final product following drying.

4. The process set forth in claims 2, further including sizing a final product following drying.

5. The process set forth in claim 4, wherein said mixture is not exposed to a temperature above substantially 60–83° C.

6. The process set forth in claim 1, including coagulating said animal blood and collecting blood solids for mixing with said hydrolyzed poultry feathers and animal offal.

7. The process set forth in claim 6, wherein said animal offal is from poultry.

8. The process set forth in claim 1, wherein a temperature of approximately 83° C. is not exceeded during processing.

9. A nutritional supplemental prepared in accordance with the process set forth in claim 1.

10. A nutritional supplemental prepared in accordance with the process set forth in claim 2.

11. A nutritional supplemental prepared in accordance with the process set forth in claim 3.

12. A nutritional supplemental prepared in accordance with the process set forth in claim 4.

13. A nutritional supplemental prepared in accordance with the process set forth in claim 5.

14. A nutritional supplemental prepared in accordance with the process set forth in claim 6.

15. A nutritional supplemental prepared in accordance with the process set forth in claim 7.

16. A nutritional supplemental prepared in accordance with the process set forth in claim 8.

* * * * *